US006978359B2

(12) United States Patent
Miyamori (10) Patent No.: US 6,978,359 B2
(45) Date of Patent: Dec. 20, 2005

(54) MICROPROCESSOR AND METHOD OF ALIGNING UNALIGNED DATA LOADED FROM MEMORY USING A SET SHIFT AMOUNT REGISTER INSTRUCTION

(75) Inventor: Takashi Miyamori, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 624 days.

(21) Appl. No.: 10/061,296

(22) Filed: Feb. 4, 2002

(65) Prior Publication Data

US 2002/0108027 A1  Aug. 8, 2002

(30) Foreign Application Priority Data

Feb. 2, 2001   (JP)  .............................. 2001-027066

(51) Int. Cl.[7] .............................................. G06F 15/00
(52) U.S. Cl. ........................ 712/204; 712/300; 712/223
(58) Field of Search ........................ 712/204, 300, 712/223

(56) References Cited

U.S. PATENT DOCUMENTS

| 3,916,388 | A | * | 10/1975 | Shimp et al. ............... 711/201 |
| 4,219,874 | A | * | 8/1980 | Gusev et al. ............... 712/300 |
| 4,814,976 | A | | 3/1989 | Hansen et al. |
| 5,367,705 | A | * | 11/1994 | Sites et al. ..................... 712/41 |
| 5,398,328 | A | * | 3/1995 | Weber et al. ............... 717/143 |
| 5,922,066 | A | * | 7/1999 | Cho et al. .................... 712/204 |
| 6,061,779 | A | * | 5/2000 | Garde ......................... 712/204 |
| 6,282,633 | B1 | * | 8/2001 | Killian et al. ............... 712/208 |
| 6,430,684 | B1 | * | 8/2002 | Bosshart ..................... 712/300 |
| 6,434,693 | B1 | * | 8/2002 | Senter et al. ............... 712/245 |
| 6,654,872 | B1 | * | 11/2003 | Ramesh et al. ............. 712/204 |
| 6,721,866 | B2 | * | 4/2004 | Roussel et al. ............. 711/201 |

OTHER PUBLICATIONS

"IA-64 Application Developer's Architecture Guide." Intel, May 1999. Rev. 1.0. pp. 4-6 & 7-169.*

* cited by examiner

*Primary Examiner*—Eddie Chan
*Assistant Examiner*—Kevin Rizzuto
(74) *Attorney, Agent, or Firm*—Oblon, Spivak, McClelland, Maier & Neustadt, P.C.

(57) ABSTRACT

An aspect of the present invention provides a method of processing unaligned data in a microprocessor including, storing a first part of the unaligned data in a first register, storing a second part of the unaligned data in a second register, calculating a shift amount applied to the unaligned data, concatenating the data stored in the first and second registers, shifting the concatenated data by the calculated shift amount, and storing the shifted result in one of the first and second registers.

14 Claims, 12 Drawing Sheets

| Instruction | Mnemonic | Function | Operation code |
|---|---|---|---|
| Load word | lw Rn, disp (Rm) | Adds a 16-bit displacement value to a value in a register Rm to provide an effective address whose lower two bits are zeroed, and loads data from the effective address of a memory into a register Rn | 1100nnnnmmmm1110 dddddddddddddddd |
| Store word | sw Rn, disp (Rm) | Adds a 16-bit displacement value to a value in a register Rm to provide an effective address whose lower two bits are zeroed, and stores a value from a register Rn into a memory based on the effective address | 1100nnnnmmmm1010 dddddddddddddddd |
| Set SAR byte | ssarb disp (Rm) | Adds a 2-bit displacement to a value in a register Rm, multiplies the sum by 8, and stores the product in the SAR if big endian, and if little endian, subtracts the product from 32 and stores the difference in the SAR | 000100ddmmmm1100 |
| Funnel shift based on byte | fsft Rn, Rm | Concatenates values in registers Rn and Rm and shifts the concatenated result by a value in the SAR | 0010nnnnmmmm1111 |
| Arithmetic right shift | sra Rn, imm | Arithmetically right-shifts a value in a register Rn by a value imm | 0110nnnniiii011 |
| Logical right shift | srl Rn, imm | Logically right-shifts a value in a register Rn by a value imm | 0110nnnniiii010 |
| Logical left shift | sll Rn, imm | Logically left-shifts a value in a register Rn by a value imm | 0110nnnniiii110 |
| Store control register | stc Rn, SAR | Stores a value from a register Rn into the SAR | 0111nnnn00111000 |

FIG.3A

| Mnemonic | Operation code | Immediate value (32 bits) |
|---|---|---|
| lw   Rn, disp (Rm) | 1100nnnnmmmm1110 dddddddddddddddd | (Sign-extended 16 bits) ‖ dddddddddddddddd |
| sw   Rn, disp (Rm) | 1100nnnnmmmm1010 dddddddddddddddd | (Sgn-extended 16 bits) ‖ dddddddddddddddd |
| ssarb disp (Rm) | 000100ddmmmm1100 | (Zero-extended 30 bits) ‖ dd |
| fsft  Rn, Rm | 0010nnnnmmmm1111 | Undefined |
| sra   Rn, imm | 0110nnnniiiii011 | (Zero-extended 27 bits) ‖ iiiii |
| srl   Rn, imm | 0110nnnniiiii010 | (Zero-extended 27 bits) ‖ iiiii |
| sll   Rn, imm | 0110nnnniiiii110 | (Zero-extended 27 bits) ‖ iiiii |
| stc   Rn, SAR | 0111nnnn00111000 | Undefined |

FIG.3B

| Mnemonic | Writeback inf. | Writeback register No. | SAR white inf. |
|---|---|---|---|
| lw   Rn, disp (Rm) | Enable | Rn | Disable |
| sw   Rn, disp (Rm) | Disable | — | Disable |
| ssarb disp (Rm) | Disable | — | Enable |
| fsft  Rn, Rm | Enable | Rn | Disable |
| sra   Rn, imm | Enable | Rn | Disable |
| srl   Rn, imm | Enable | Rn | Disable |
| sll   Rn, imm | Enable | Rn | Disable |
| stc   Rn, SAR | Disable | — | Enable |

FIG.4

| Instruction code register | Corresponding instruction | Operation |
|---|---|---|
| 11001110 | lw Rn, disp (Rm) | Adds a value in the immediate register 8 to a value in a source register Rm (10) and stores the sum in the pipeline register 14 |
| 11001010 | sw Rn, disp (Rm) | Adds a value in the immediate register 8 to a value in a source register Rm (10) and stores the sum in the pipeline register 14 |
| 00011100 | ssarb disp (Rm) | Adds a value in immediate register 8 to a value in a source register Rm (10), multiplies a lower 2-bit value by 8, and stores the product in the SAR 12 if big endian, and if little endian, subtracts the product from 32 and stores the difference in the pipeline register 14 |
| 00101111 | fsft Rn, Rm | Receives values from source registers Rn (9) and Rm (10), concatenates the value in the register Rn as higher 32 bits and the value in the register Rn as lower 32 bits to from 64-bit data, left-shifts the concatenated result by lower 6 bits in the SAR 12, and stores higher 32 bits of the left-shifted result in pipeline register 14 |
| 01100011 or 01101011 | sra Rn, imm | Arithmetically right-shifts a value in a source register Rn (9) by a shift amount represented with lower 5 bits of the immediate register 8 and stores the shifted result in the pipeline register 14 |
| 01100010 or 01101010 | srl Rn, imm | Logically right-shifts a value in a source register Rn (9) by a shift amount represented with lower 5 bits of the immediate register 8 and stores the shifted result in the pipeline register 14 |
| 01100110 or 01101110 | sll Rn, imm | Logically left-shifts a value in a source register Rn (9) by a shift amount represented with lower 5 bits of the immediate register 8 and stores the shifted result in the pipeline register 14 |
| 01111000 | stc Rn, SAR | Stores a value from a source register Rn (9) in the SAR 12 |

FIG.5A

```
lw      R0, 3(R4)       # R0 = (0,1,2,3)
lw      R1, 7(R4)       # R1 = (4,5,6,7)
ssarb   3(R4)           # SAR = 3*8 = 24
fsft    R0, R1          # R0 = (3,4,5,6)
```

FIG.5B

```
lw      R0, 3(R4)       # R0 = (0,1,2,3)
lw      R1, 7(R4)       # R1 = (4,5,6,7)
ssarb   3(R4)           # SAR = 3*8 = 24
fsft    R0, R1          # R0 = (3,4,5,6)
sra     R0, 16          # R0 =(Sign Extension 16 bits,3,4)
```

FIG.5C

```
lw      R0, 3(R4)       # R0 = (3,2,1,0)
lw      R1, 7(R4)       # R1 = (7,6,5,4)
ssarb   3(R4)           # SAR = 32-3*8 = 8
fsft    R1, R0          # R1 = (6,5,4,3)
```

FIG.5D

```
lw      R0, 3(R4)       # R0 =(3,2,1,0)
lw      R1, 7(R4)       # R1 = (7,6,5,4)
ssarb   3(R4)           # SAR = 32-3*8 = 8
fsft    R1, R0          # R1 =(6,5,4,3)
sll     R1, 16          # R1 = (4,3,-,-)
sra     R1, 16          # R1 =(Sign Extension 16 bits,4,3)
```

FIG.5E

```
                        # R3 = (A,B,C,D)
lw      R0, 3(R4)       # R0 = (0,1,2,3)
lw      R1, 7(R4)       # R1 = (4,5,6,7)
ssarb   3(R4)           # SAR = 3*8 = 24
fsft    R1, R0          # R1 = (7,0,1,2)
mov     R2, R1          # R1→R2
ssarb   1(R4)           # SAR = 1*8 = 8
fsft    R1, R3          # R1 = (0,1,2,A)
fsft    R3, R2          # R3 = (B,C,D,7)
sw      R1, 3(R4)
sw      R3, 7(R4)
```

(3) SAB | 24 |

(4) R0 | 3 | 4 | 5 | 6 |  ⇐ SHIFT 24 BIT

(3)　SAB　| 8 |

(4)　| 7 | 6 | 5 | 4 | 3 | 2 | 1 | 0 |

R0　| 6 | 5 | 4 | 3 |　⇐ SHIFT 8 BIT

(3) SAB (4)

BIG ENDIAN

| 31 | 23 | 15 | 7 | 0 |
|---|---|---|---|---|
| | | 0 | | |
| | | 4 | | |
| | | 8 | | |

FIG.11B

LITTLE ENDIAN

| 31 | 23 | 15 | 7 | 0 |
|---|---|---|---|---|
| | | 0 | | |
| | | 4 | | |
| | | 8 | | |

FIG.12A

BIG ENDIAN

| 31 | 23 | 15 | 7 | 0 |
|---|---|---|---|---|
| 0 | | 2 | | |
| 4 | | 6 | | |
| 8 | | a | | |

FIG.12B

LITTLE ENDIAN

| 31 | 23 | 15 | 7 | 0 |
|---|---|---|---|---|
| 2 | | 0 | | |
| 6 | | 4 | | |
| a | | 8 | | |

FIG.13A

BIG ENDIAN

| 31 | 23 | 15 | 7 | 0 |
|---|---|---|---|---|
| 0 | 1 | 2 | 3 | |
| 4 | 5 | 6 | 7 | |
| 8 | 9 | a | b | |

FIG.13B

LITTLE ENDIAN

| 31 | 23 | 15 | 7 | 0 |
|---|---|---|---|---|
| 3 | 2 | 1 | 0 | |
| 7 | 6 | 5 | 4 | |
| b | a | 9 | 8 | |

Background Art

FIG.14A

| 31 24 | 23 16 | 15 8 | 7 0 |
|---|---|---|---|
| 3 | 4 | 5 | 6 |

Background Art

FIG.14B

LWL INSTRUCTION

| 31 24 | 23 16 | 15 8 | 7 0 |
|---|---|---|---|
| 3 | .. | .. | .. |

LWR INSTRUCTION

| 31 24 | 23 16 | 15 8 | 7 0 |
|---|---|---|---|
| 3 | 4 | 5 | 6 |

MICROPROCESSOR AND METHOD OF ALIGNING UNALIGNED DATA LOADED FROM MEMORY USING A SET SHIFT AMOUNT REGISTER INSTRUCTION

CROSS REFERENCE TO RELATED APPLICATIONS

This application is based upon and claims benefit of priority from the prior Japanese Patent Application No. P2001-27066 filed on Feb. $2^{nd}$ 2001, the entire contents of which are incorporated by reference herein.

BACKGROUND OF THE INVENTION

1. Field of the Invention

The present invention relates to a microprocessor and a method of processing unaligned data in a microprocessor. In particular, the present invention relates to a technique of aligning unaligned data in a memory system.

2. Description of the Related Art

Figure 11A:
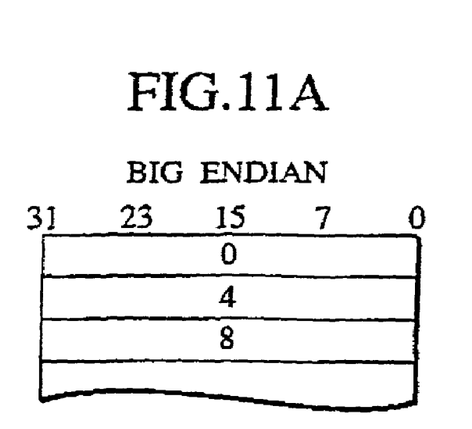
FIGS. 11A, 12A, and 13A show examples of memories based on the big endian method.
Figure 11B:
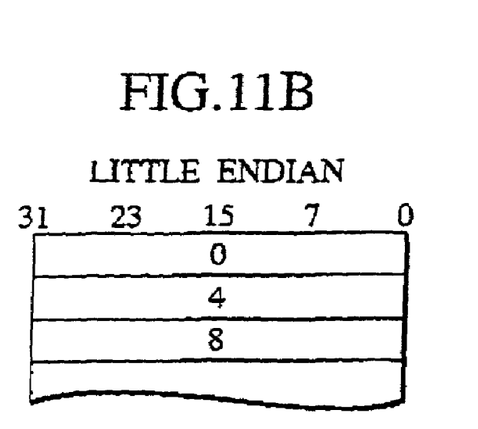
FIGS. 11B, 12B, and 13B show examples of memories based on the little endian method.
Figure 12A:
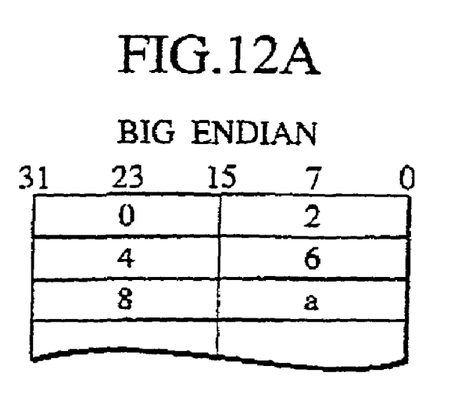
Figure 12B:
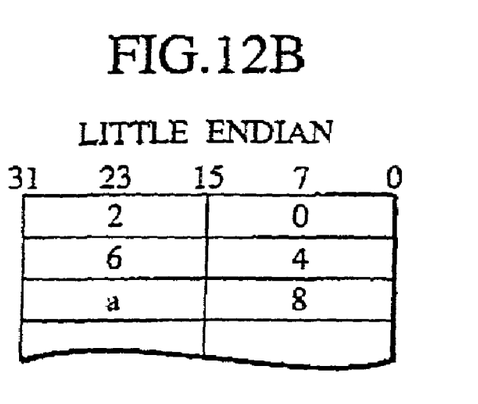
Figure 13A:
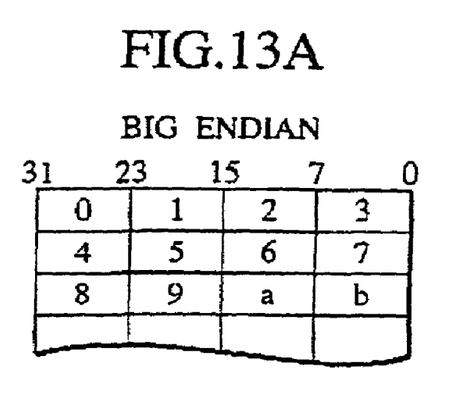
Figure 13B:
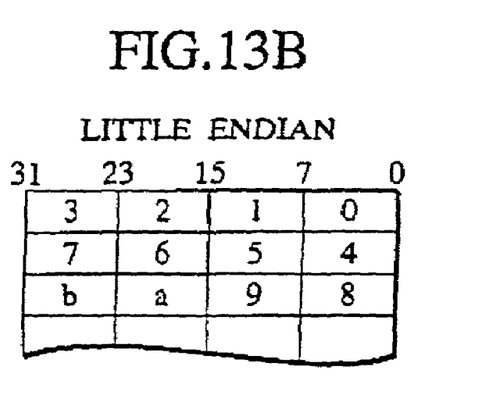

Microprocessors store multibyte data in memories according to a big endian method or a little endian method. FIGS. 11A, 12A, and 13A show the addresses of data stored in memories based on the big endian method, in which FIG. 11A shows a memory storing word (32-bit) data, FIG. 12A shows a memory storing half-word (16-bit) data, and FIG. 13A shows a memory storing byte (8-bit) data. FIGS. 11B, 12B, and 13B show the addresses of data stored in memories based on the little endian method, in which FIG. 11B shows a memory storing word data, FIG. 12B shows a memory storing half-word data, and FIG. 13B shows a memory storing byte data. Each of these memories has a width of 32 bits and addresses 0 to b (hexadecimal number system).

A memory based on the big endian method places a byte 0 at the highest (leftmost) byte position. A memory based on the little endian method places a byte 0 at the lowest (rightmost) byte position.

Figure 14A:
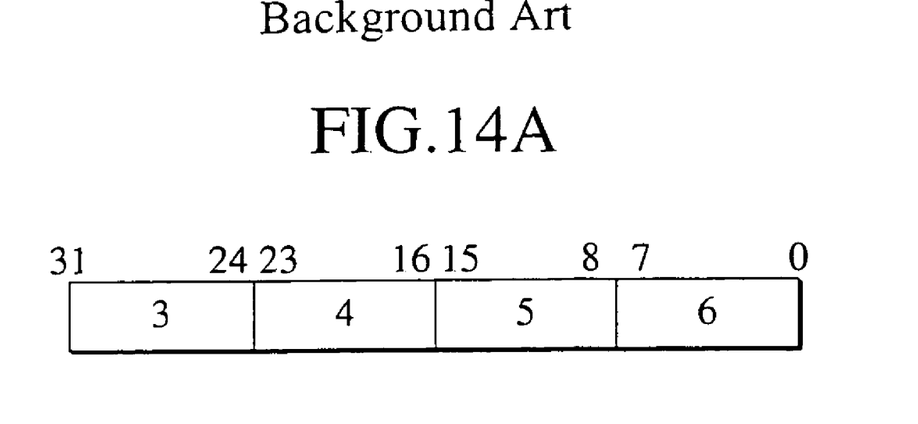
FIGS. 14A and 14B explain a data aligning process according to a related art.

FIG. 14A shows a set of word data starting from an address 3. This data is stored in, for example, the memory of FIG. 13A based on the big endian method. Namely, an address-3 section of the word data of FIG. 14A is contained in a row of addresses 0 to 3 in the memory of FIG. 14A, and address-4 to -6 sections of the word data ot FIG. 14A are contained in a row of addresses 4 to 7 in the memory of FIG. 13A. The word data shown in FIG. 14A, therefore, is unaligned data in the memory of FIG. 13A. To align this unaligned data, it is necessary to read the address-3 section and the address-4 to 6 sections from the memory of FIG. 14A and store the address-3 section at bits 31 to 24 in a register and the address-4 to -6 sections at bits 23 to 0 in the register. To align such unaligned data, several related arts have been proposed.

One related art is U.S. Pat. No. 4,814,956 Hansen). Hansen discloses a microprocessor employing special instructions to load unaligned data from a memory into a register in the microprocessor, align the value in the register, and store the aligned value in the memory.

Figure 14B:
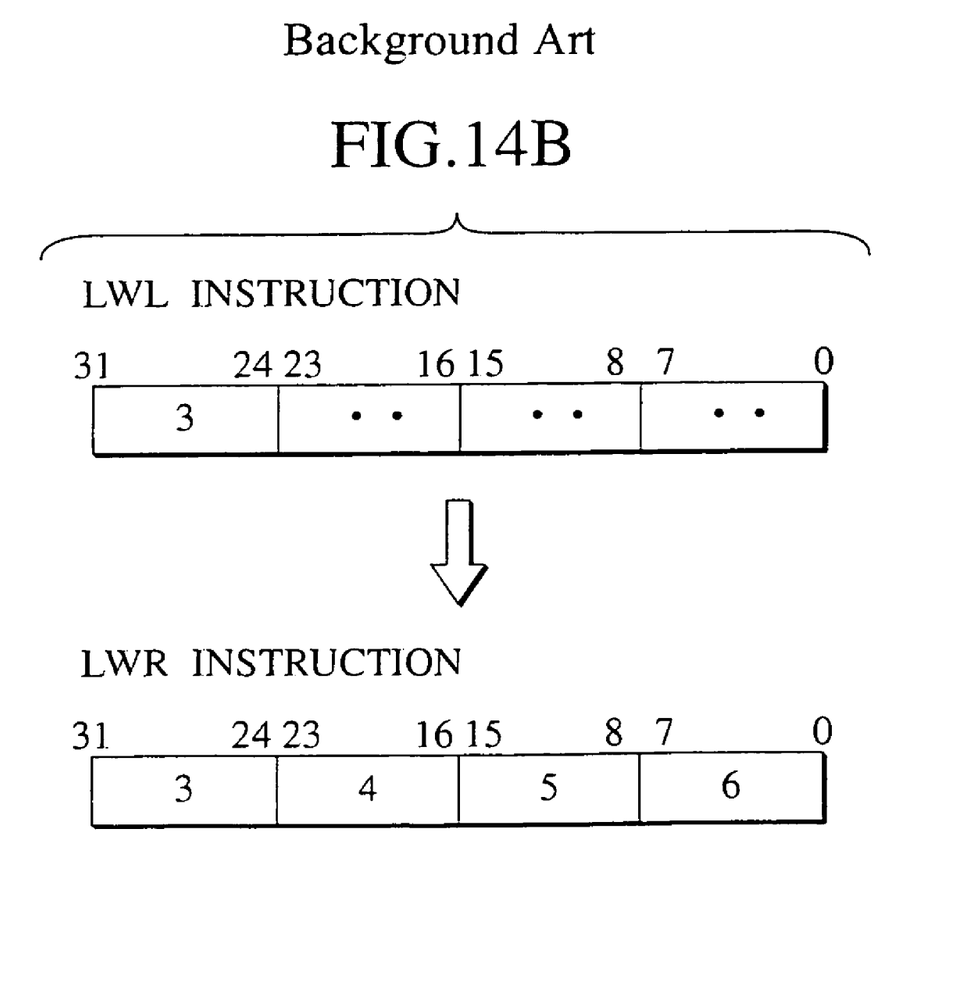

FIG. 14B shows an example of a process of aligning unaligned data according to Hansen. To align unaligned data, the related art consecutively executes instructions of "Load Word Left" and "Load Word Right." The prior art stores a result of the Load Word Left instruction in an intermediate register and merges it with a result of the Load Word Right instruction. This requires a special shift/merge unit. To store unaligned data in a memory, the related art must consecutively execute the instructions "Store Word Left" and "Store Word Right." These instructions behave differently from other load and store instructions, and therefore, are difficult to implement in a microprocessor. After loading unaligned data from a memory into a register, the related art must execute shifting and merging operations, to cause a critical path in terms of timing.

SUMMARY OF THE INVENTION

An aspect of the present invention provides a microprocessor including, a register file configured to store data to be used for operations, a first register configured to store a first register value related to unaligned data and read out of the register file, a second register configured to store a second register value related to the unaligned data and read out of the register file an execution unit configured to calculate a shift amount applied to the unaligned data a shift amount register configured to store the calculated shift amount, and a shift unit configured to concatenate the first and second register values and shift the concatenated result by the shift amount stored in the shift amount register.

Another aspect of the present invention provides a method of processing unaligned data i a microprocessor including, storing a first part of the unaligned data in a first register, storing a second part of the unaligned data in a second register, calculating a shift amount applied to the unaligned data, concatenating the data stored in the first and second registers, shifting the concatenated data by the calculated shit amount, and storing the shifted result in one of the first and second registers.

BRIEF DESCRIPTION OF THE DRAWINGS

FIG. 4 is a table showing the operations of the instructions shown in FIG. 2;

DETAILED DESCRIPTION OF EMBODIMENTS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 1:
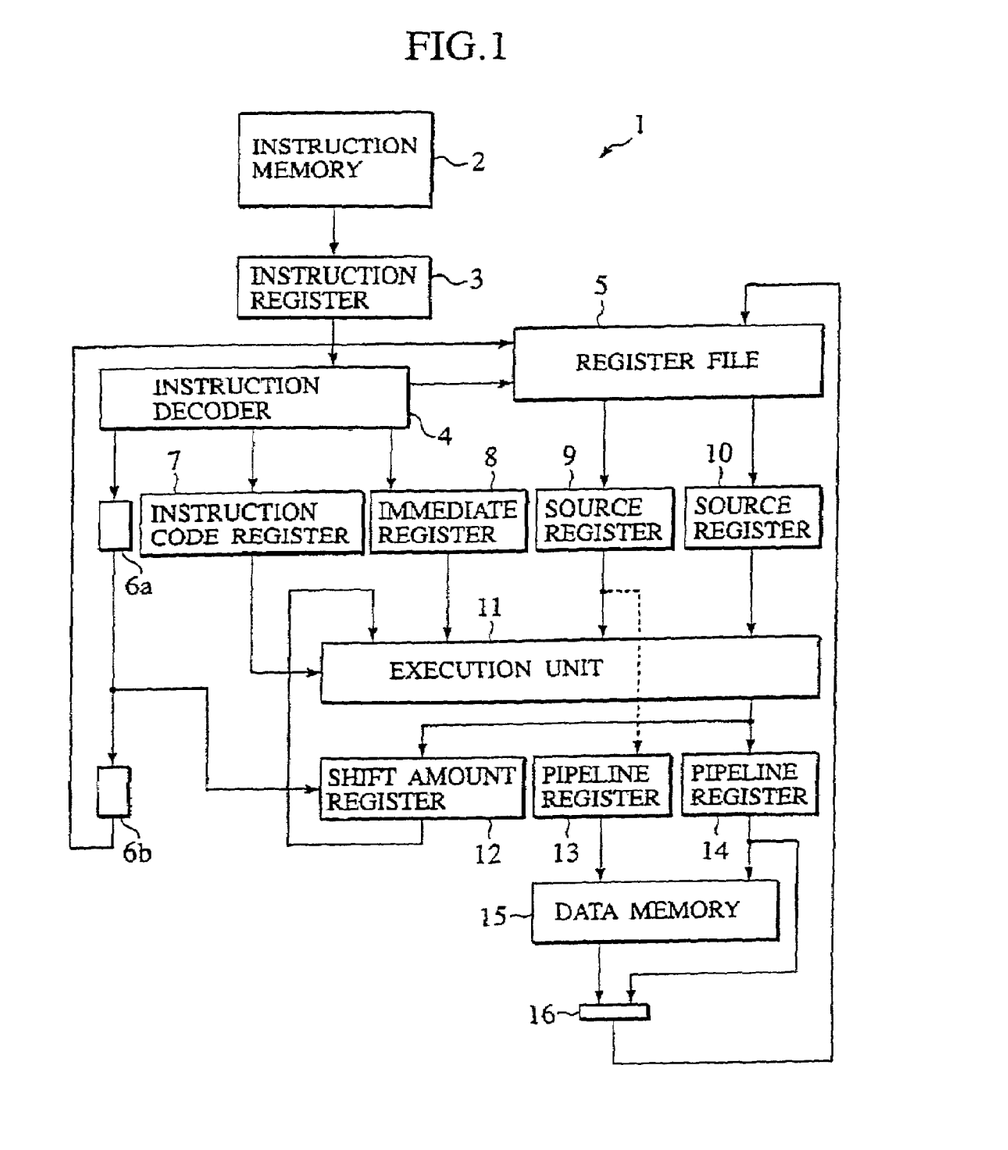
FIG. 1 is a block diagram showing a microprocessor according to an embodiment of the present invention.

FIG. 1 shows a microprocessor according to an embodiment of the present invention. The microprocessor I has an instruction memory 2, an instruction register 3, an instruction decoder 4, a register file 5, writeback information registers 6a and 6b, an instruction code register 7, an immediate register 8, source registers 9 and 10, an execution unit 11, a shift amount register (SAR) 12, a pipeline register 13, a pipeline register 14, a data memory 15, and a selector 16.

An instruction executing operation of the microprocessor 1 will be explained. The microprocessor 1 executes an instruction in five pipeline stages. The first pipeline stage is an instruction fetch stage that reads an instruction from the instruction memory 2 and stores it in the instruction register 3.

The second pipeline stage is an instruction decode stage. The register values that are specified by the instruction stored in the instruction register 3 are read from and stored into the source register 9 and 10. The instruction decoder 4 decodes the instruction stored in the instruction register 3, to control the execution unit 11. The instruction decoder 4 extracts an immediate value from the instruction and stores the immediate value in the immediate register 8. If the instruction is going to write an execution result back into the register file 5, a register number and write enable information are stored in the register 6a.

The third pipeline stage is an execution stage that employs the immediate value or values read from the register file 5 and executes the instruction in the execution unit 11. An execution result is stored in the pipeline register 14 or shift amount register 12. If the instruction is a load instruction or a store instruction, an effective address of the data memory 15 is calculated and the calculated effective address is stored in the pipeline register 14. The information in the register 6a is stored in the register 6b. A value from the source register 9 is stored in the pipe register 13.

The fourth pipeline stage is a memory stage. If the instruction is a memory load instruction, a value is read from the data memory 15 according to the effective address stored in the pipeline register 14. The read value or an operation result from the execution unit 11 is selected by the selector 16. If the instruction is a store instruction, the value in the pipe register 13 is written into the data memory 15 according to the effective address stored in the pipeline register 14.

The fifth pipeline stage is a register writeback stage. If the information stored in the register 6b indicates that register writeback is enabled, the output of the selector 16 is written into a specified register in the register file 5.

Figure 2:
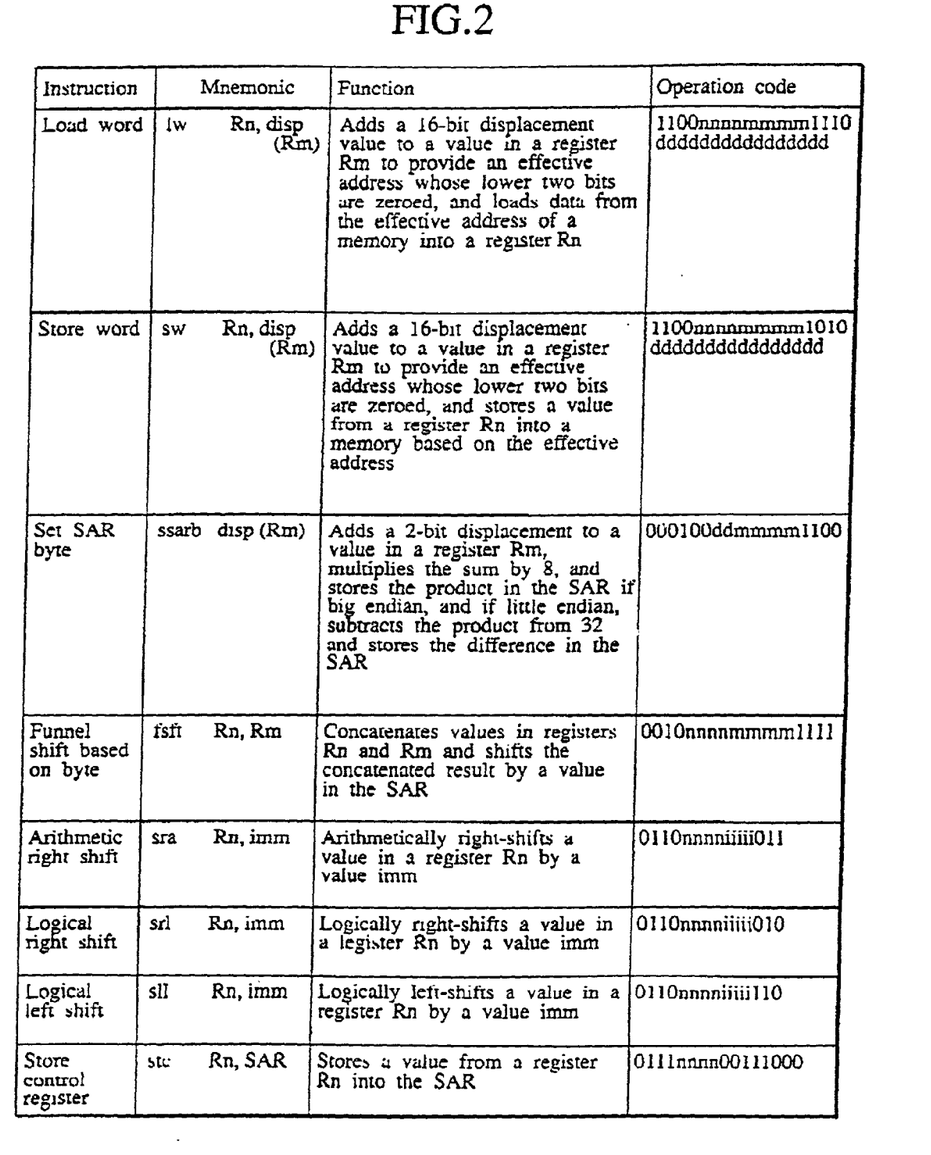
FIG. 2 is a table showing Some instructions stored in an instruction memory of the microprocessor of FIG. 1.

FIG. 2 is a table showing the mnemonics, functions, and operation codes of typical instructions stored in the instruction memory 2. A load word (LW) instruction is a 32-bit instruction with bits 31 to 28 being "1100," bits 19 To 16 being "1110," a 4-bit nnnn field specifying a register number Rn to store a loaded data, a 4-bit mmmm field specifying a register number Rm in the register file 5 to calculate an effective address, and bits 15 to 0 representing a 16-bit constant value. This 16-bit constant value is sign-extended to a 32-bit value, which is added to a value stored at the register number Rm, to provide an effective address. At this time, lower two bits of the effective address are zeroed. According to the effective address, word data is read from the data memory 15. The read data is stored at the register number Rn in the register file 5.

A store word (SW) instruction is a 32-bit instruction with bits 31 to 28 being "1100," bits 19 to 16 being "1010," a 4-bit nnnn field specifying a register number Rn in the register file 5 from which data is stored in the data memory 15, a 4-bit mmmm field specifying a register number Rm in the register file 5 to calculate an effective address, and bits 15 to 0 representing a 16-bit constant value. The 16-bit constant value is sign-extended to a 32-bit value, which is added to a value stored at the register number Rm, to provide an effective address. At this time, lower two bits of the effective address are zeroed. According to the effective address, a value at the register number Rn is written into the data memory 15.

A set SAR byte (SSARB) instruction is a 16-bit instruction with bits 15 to 12 being "0001," bits 3 to 0 being "1100," and a 4-bit mmmmm field specifying a register number Rm in the register file 5 to calculate an effective address. Lower two bits of data stored at the register number Rm are added to two bits 9 and 8 of the instruction, to provide a sum serving as lower two bits of an effective address. In the case of the big endian method, the sum is multiplied by 8 to provide a product, and the product is stored in the shift amount register 12. In the case of the little endian method, the sum is multiplied by 8 to provide a product, the product is subtracted from 32 to provide a difference, and the difference is stored in the shift amount register 12.

A funnel shift (FSFT) instruction is a 16-bit instruction with bits 15 to 12 being "0010," bits 3 to 0 being "1111," a 4-bit nnnn field specifying a register number Rn in the register file 5 to store input data, and a 4-bit mmmm field specifying a register number Rm in the register file 5 as an input data. In the execution stage, the value stored at the register number Rn serves higher 32 bits, the value stored at the register number Rm serves lower 32 bits, and they are concatenated to form 64-bit data. This 64-bit data is left-shifted by a shift amount specified by lower six bits stored in the shift amount register 12. Higher 32 bits of a result of the left shift are provided as an execution result, which is stored in the register number Rn of the register file 5.

An arithmetic right shift (SRA) instruction is a 16-bit instruction with bits 15 to 12 being "0110," bits 2 to 0 being "011," a 4-bit nnnn filed specifying a register number Rn in the register file 5 as an input data, and an iiii field specifying a bit-based shift amount imm. In the execution stage, the value stored at the register number Rn is arithmetically right-shifted by the imm bits, and the shifted result is provided as an execution result, which is stored in the register number Rn of the register file 5. The arithmetic right shift instruction inserts a highest bit value into every higher blank bit that has been freed by the arithmetic right shift operation, thereby maintaining signal information.

A logical right shift (SRL) instruction is a 16-bit instruction with bits 15 to 12 being "0110," bits 2 to 0 being "010," an nnnn field specifying a register number Rn in the register file 5 as an input data, and an iiii field specifying a bit-based shift amount imm. In the execution stage, the value stored at the register number Rn is logically right-shifted by the imm bits, and the shifted result is provided as an execution result, which is stored in the register number Rn of the register file 5. The logical right shift instruction inserts 0 into every higher blank bit that has been freed by the logical right shift operation.

A logical left shift (SLL) instruction is a 16-bit instruction with bits 15 to 12 being "0110," bits 2 to 0 being "110," an nnnn field specifying a register number Rn in the register file 5 as an input data, and an iiii field specifying a bit-based shift amount imm. In the execution stage, the value stored at the register number Rn is logically left-shifted by the imm bits, and the shifted result is provided as an execution result, which is stored in the register number Rn of the register file 5. The logical left shift instruction inserts 0 into every lower blank bit that has been freed by the logical left shift operation.

A store control register (STC) instruction is a 16-bit instruction with bits 15 to 12 being "0111," bits 3 to 0 being "1000," an nnnn field specifying a register number Rn in the register file 5 to read a value stored in the register Rn. Lower bits of the read value are stored in the shift amount register 12.

Figure 3A:
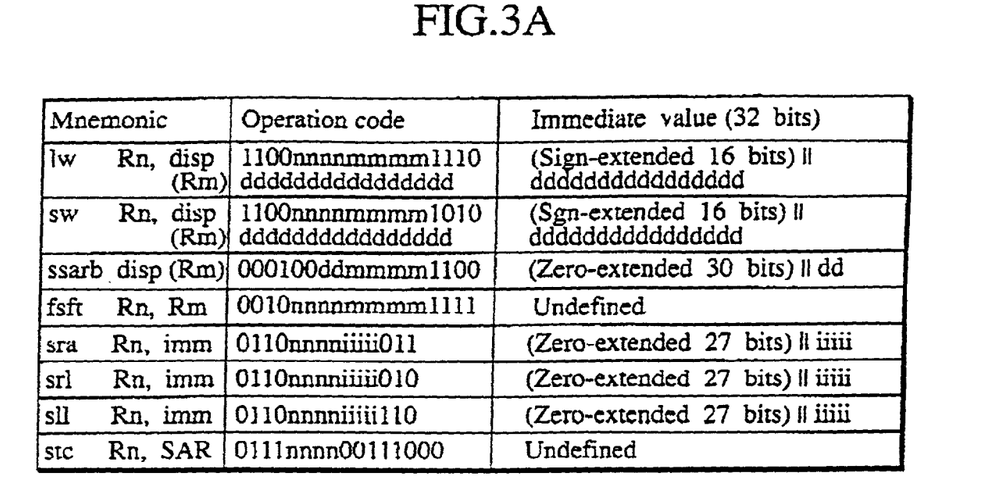
FIGS. 3A and 3B are tables showing relationships among the instructions shown in FIG. 2, immediate values, and writeback information.
Figure 3B:
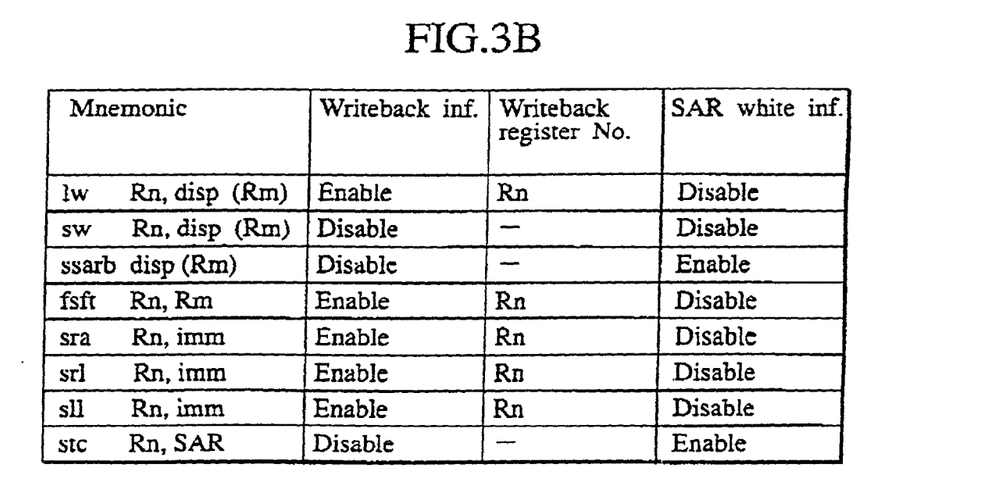

The operation of each part of the microprocessor 1 when executing the instructions mentioned above will be explained. The instruction decoder 4 receives a 16- or 32-bit instruction from the instruction register 3 and decodes the same. According to the embodiment, the instruction register 3 is a 32-bit register, and when storing a 16-bit instruction, stores it at higher 16 bits. The instruction decoder 4 picks up bits 31 to 28 and 19 to 16 from the instruction register 3 as instruction codes and transfers them to the instruction code register 7. At the same time, the instruction decoder 4 picks up bits 27 to 24 and 23 to 20 from the instruction register 3 as fields to specify register numbers Rn and Rm in the register file 5, and transfer them to the source register 9 and 10, respectively. The instruction decoder 4 calculates an immediate value shown in FIG. 3A from an operation code and stores the calculated immediate value in the immediate register 8. If the instruction is to write data into a register, the instruction decoder 4 stores a corresponding register number and writeback information shown in FIG. 3B in the writeback information register 6a. If the instruction writes data into the shift amount register 12, shift amount write information is enabled as shown in FIG. 3B.

The register file 5 receives the register numbers Rn and Rm from the instruction decoder 4 and provides the source registers 9 and 10 with values corresponding to the register numbers Rn and Rm, respectively. If the register 6b shows that the register writeback information is enabled, the output of the selector 16 is written into the register number specified by the register 6b.

The execution unit 11 receives the values from the source registers 9 and 10, immediate register 8, and shift amount register 12 as input data, executes operations on the input data according to the codes stored in the instruction code register 7, and stores a result in the pipeline register 14 or shift amount register 12. FIG. 4 is a table showing the instructions shown in FIG. 2 and their operations, An operation result is written into the shift amount register 12 only when the shift amount write information in the register 6a is enabled.

Figure 5A:
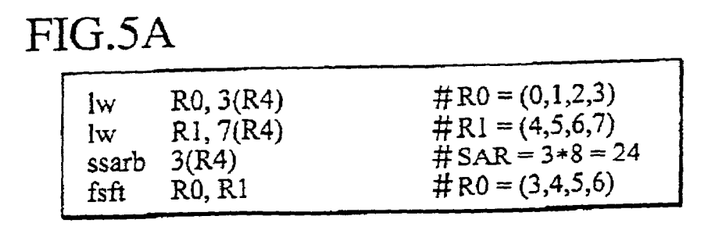
FIGS. 5A to 5E show examples for processing unaligned data according to the embodiment of the present invention.
Figure 5B:
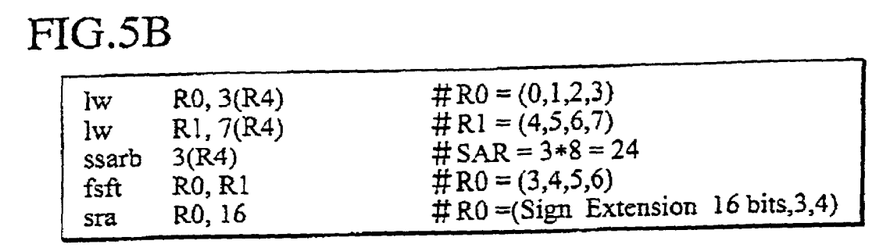
Figure 5C:
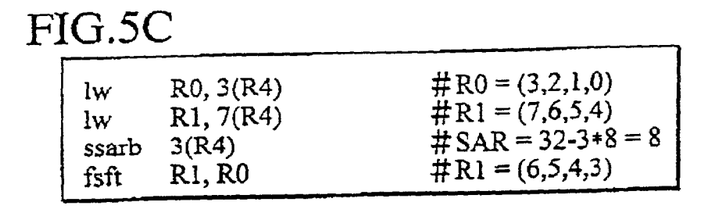
Figure 5D:
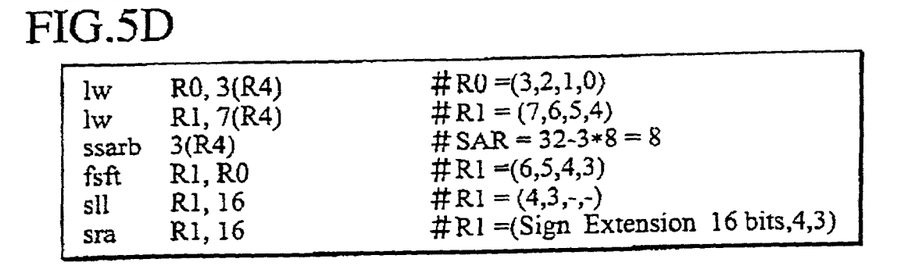
Figure 5E:
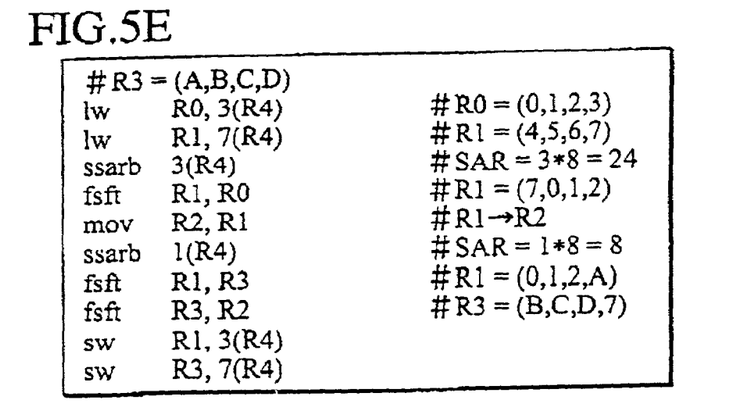

FIGS. 5A to 5E show examples for processing unaligned data according to the embodiment of the present invention. FIG. 5A shows an example of loading word data starting from an address 3 based on the big endian method. FIG. 5B shows an example of loading signed half-word data starting from an address 3 based on the big endian method. FIG 5C shows an example of loading word data starting from an address 3 based on the little endian method. FIG. 5D shows an example of loading signed half-word data starting from an address 3 based on the little endian method. FIG. 5E shows an example of storing word data (A, B, C, D) into an address 3 based on the big endian method.

The microprocessor 1 accesses, concatenates, and shifts unaligned data by using the set SAR byte (SSARB) instruction and funnel shift (FSFT) instruction. Examples of unaligned data processing operations according to the embodiment of the present invention will be explained with reference to FIGS. 6 to 10.

Figure 6:
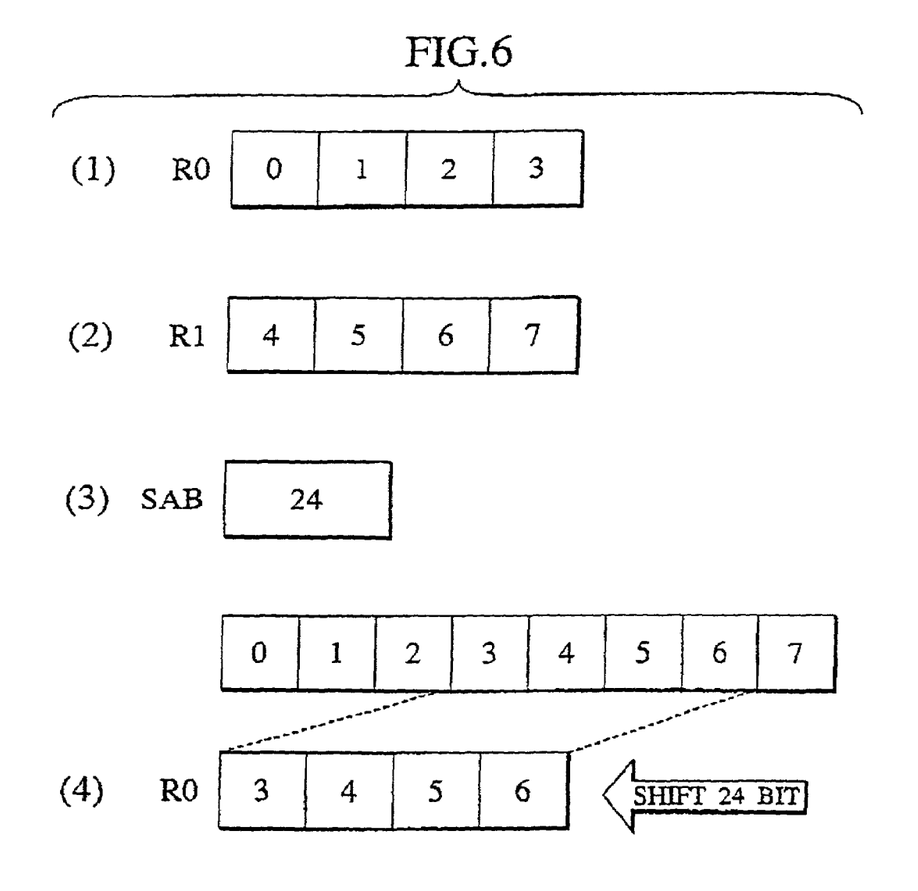
FIGS. 6 to 10 are examples showing data aligning operations carried out by the microprocessor of FIG. 1.

FIG. 6 shows an example shown in FIG. 5A of loading word data starting from an address 3 from the data memory 15 based on the big endian method.

(1) The load word (LW) instruction is executed. A 16-bit displacement value of 3 is added to a value stored in the register number R4 of the register file 5, to provide an effective address. According to the effective address, data is loaded from the data memory 15 and is stored in the register number R0 of the register file 5.

(2) The load word (LW) instruction is executed. A 16-bit displacement value of 7 is added to the value stored in the register number R4 of the register file 5, to provide an effective address. According to the effective address, data is loaded from the data memory 15 and is stored in the register number R1 of the register file 5.

(3) The set SAR byte (SSARB) instruction is executed. A 2-bit displacement value of 3 is added to the value stored in the register number R4 of the register file 5 to provide a sum. Since this example is based on the big endian method, the sum is multiplied by 8 to provide a product, and the product is stored in the shift amount register 12. According to this example, the loaded word data starts from the address 3, and therefore, 3*8=24, i.e., "24" is stored in the shift amount register 12.

(4) The funnel shift (FSFT) instruction is executed. The values stored at the register numbers R0 and R1 are concatenated, and the value "24" in the shift amount register 12 is used as a shift amount to shift the concatenated result. The shifted result is stored at the register number R0. Consequently, the unaligned word data starting from the address 3 is aligned and stored in the register number R0 of the register file 5.

Figure 7:
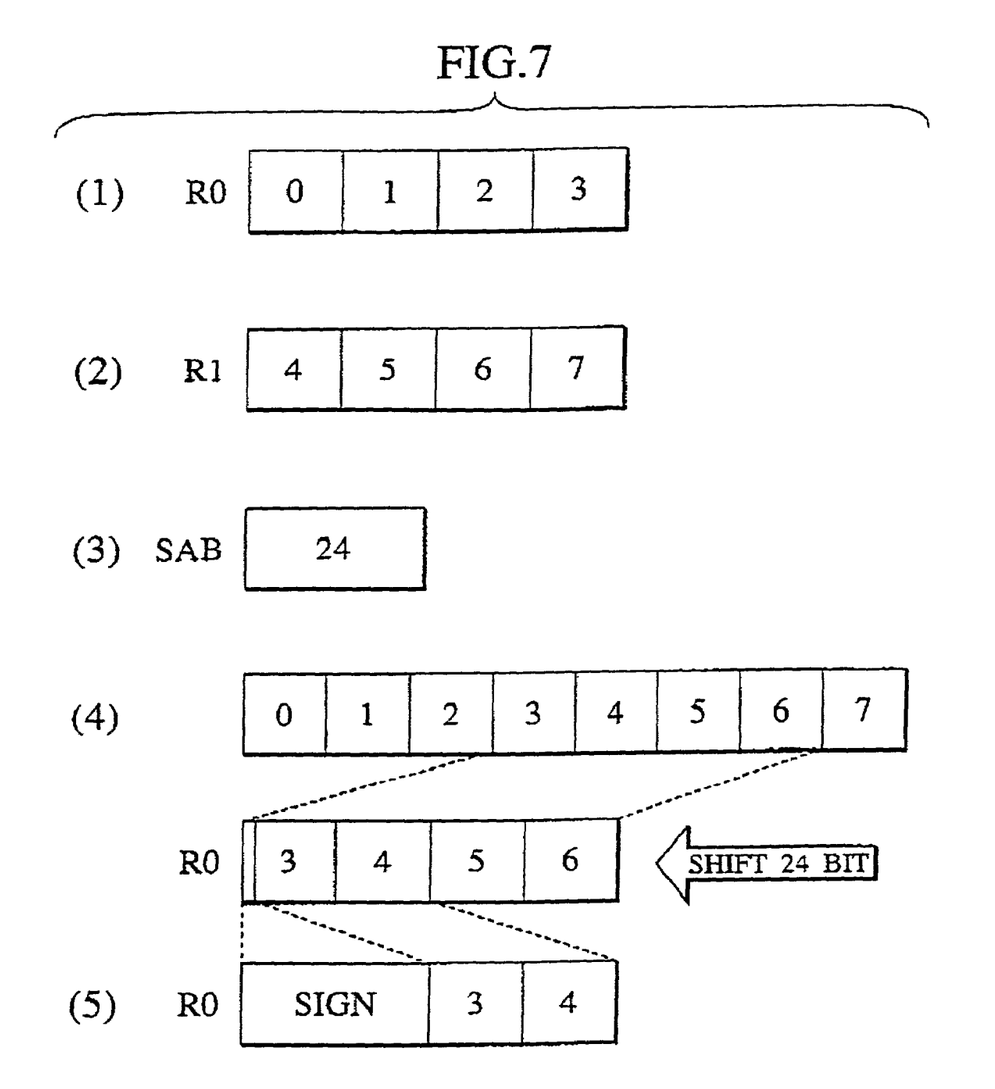

FIG. 7 shows an example shown in FIG. 5B of loading signed half-word data starting from an address 3 from the data memory 15 based on the big endian method (1) The load word (LW) instruction is executed. A 16-bit displacement value of 3 is added to a value stored in register number R4 (suppose that R4 is set zero in this embodiment), to provide an effective address. According to the effective address, data is loaded from the data memory 15 and is stored in the register number R0.

(2) The load word (LW) instruction is executed. A 16-bit displacement value of 7 is added to the value stored in the register number R4, to provide an effective address. According to the effective address, data is loaded from the data memory 15 and is stored in Me register number R1.

(3) The set SAR byte (SSARB) instruction is executed, A 2-bit displacement value of 3 is added to the value stored in the source register 10 at the register number R4 to provide a sum. Since is example is based on the big endian method, the sum is multiplied by 8 to provide a product, i.e. 24, and the product is stored in the shift amount register 12.

(4) The funnel shift (FSFT) instruction is executed. The values stored at the register numbers R0 and R1 are concatenated, and the value stored in the shift amount register 12 is used as a shift amount to shift the concatenated result. The shifted result is stored at the register number R0.

(5) The value in the register number R0 is arithmetically right-shifted by a shift amount specified by lower five bits of the immediate register 8. A result of the arithmetic right shift is stored in the register number R0.

Figure 8:
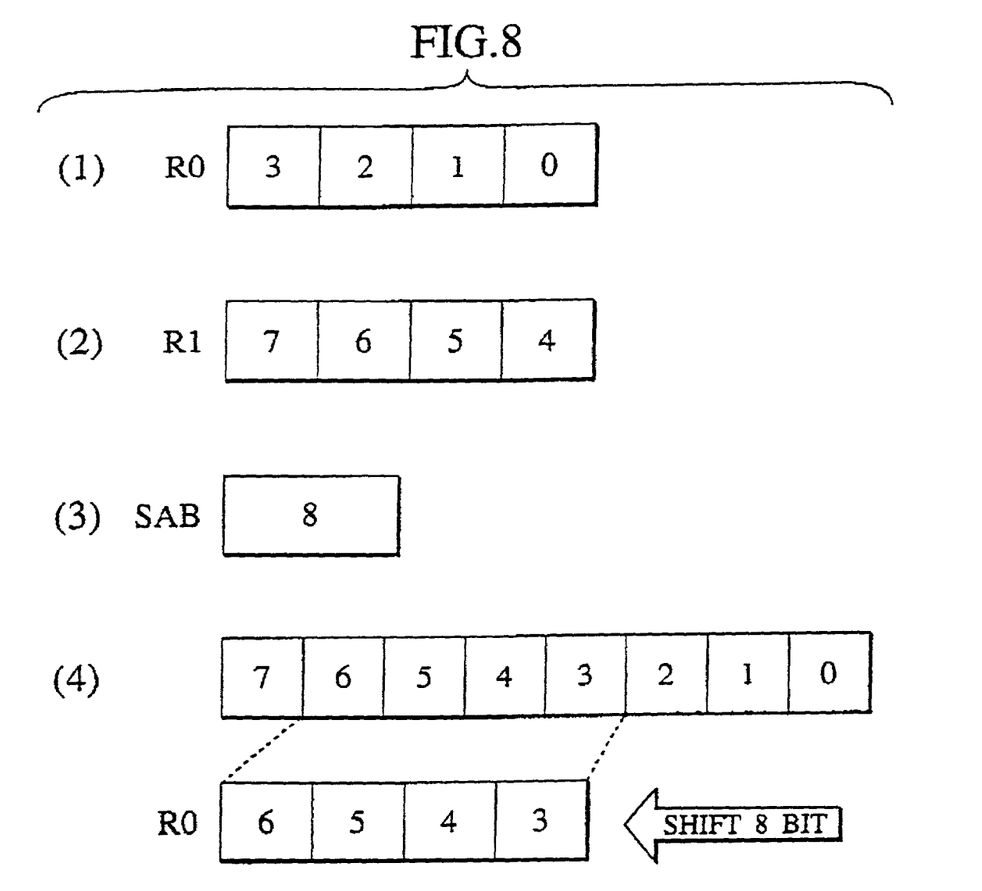

FIG. 8 shows an example shown in FIG. 5C of loading word data starting from an address 3 of the data memory 15 based on the little endian method.

(1) The load word (LW) instruction is executed. A 16-bit displacement value of 3 is added to a value stored in the register number R4, to provide an effective address. According to the effective address, data is loaded from the data memory 15 and is stored in the register number R0.

(2) The load word (LW) instruction is executed. A 16-bit displacement value of 7 is added to the value stored in the register number R4, to provide an effective address. According to the effective address, data is loaded from the data memory 15 and is stored in the register number R1.

(3) The set SAR byte (SSARB) instruction is executed. A 2-bit displacement value of 3 is added to the value stored in the register number R4 to provide a slum. Since this example is based on the little endian method, lower two bits of the sum is multiplied by 8 to provide a product, the product is subtracted from "32" to provide a result, i.e. 8, and the result is stored in the shift amount register 12.

(4) The funnel shift (FSFT) instruction is executed. The values stored at the register numbers R0 and R1 are concatenated, and the value stored in the shift amount register 12 is used as a shift amount to shift the concatenated result. The shifted result is stored at the register number R0.

Figure 9:
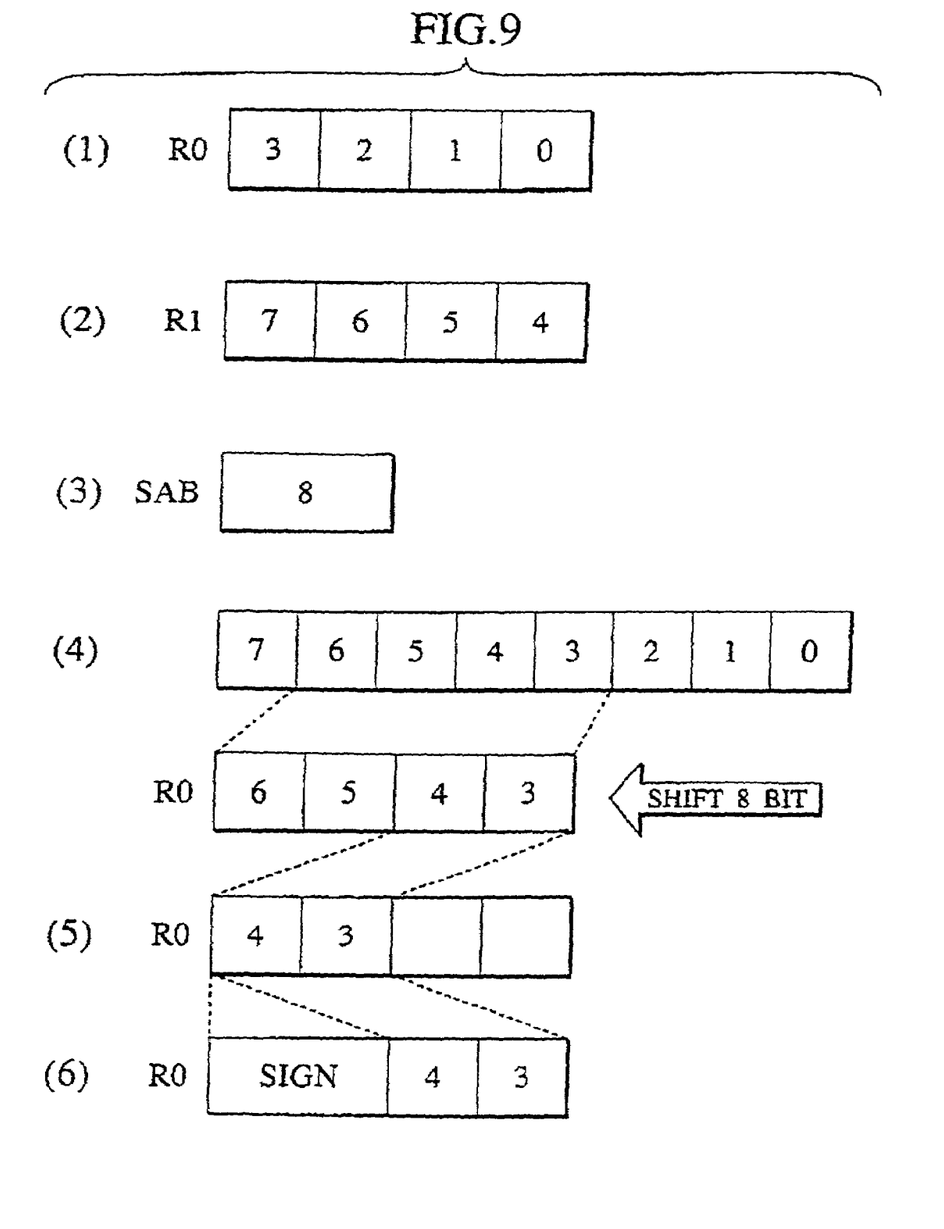

FIG. 9 shows an example shown in FIG. 5D of loading signed half-word data starting from an address 3 of the data memory 15 based on the little endian method.

(1) The load word (LW) instruction is executed. A 16-bit displacement value of 3 is added to a value stored in the register number R4 (suppose that R4 is set zero), to provide an effective address. According to the elective address, data is loaded from the data memory 15 and is stored in the register number R0.

(2) The load word (LW) instruction is executed. A 16-bit displacement value of 7 is added to the value stored in the register number R4, to provide an effective address. According to the effective address, data is loaded from the data memory 15 and is stored in the register number R1.

(3) The set SAR byte (SSARB) instruction is executed. A 2-bit displacement value of 3 is added to the value stored in the source register 10 at the register number R4 to provide a sum. Since this example is based on the little endian method, lower two bits of the sum is multiplied by 8 to provide a product, the product is subtracted from "32" to provide a result, i.e. 8, and the result is stored in the shift amount register 12.

(4) The funnel shift (FSFT) instruction is executed. The values stored at the register numbers R0 and R1 are concatenated, and the value stored in the shift amount register 12 is used as a shift amount to shift the concatenated result. The shifted result is stored at the register number R0.

(5) The logical left shift (SLL) instruction is executed. The value in the source register 9 at the register number R1 is logically left-shifted by 16 bits, and the shifted result is stored at the register number R0.

(6) The arithmetic right shift (SRA) instruction is executed. The value in the register number R1 is arithmetically right-shifted by 16 bits, and the shifted result is stored in the register number R0.

Figure 10:
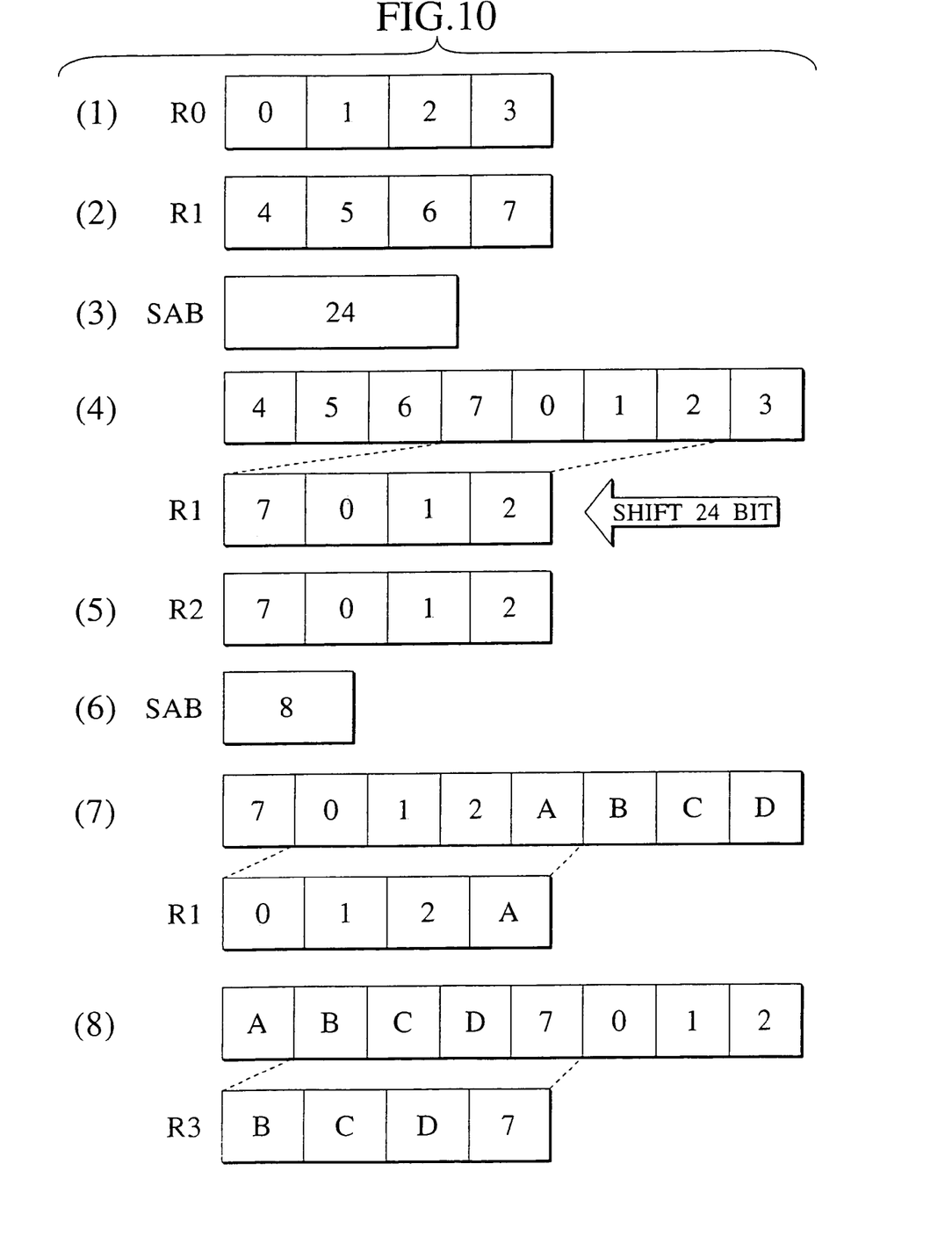

FIG. 10 shows an example shown in FIG. 5E of storing word data R3 in the data memory 15 at an address 3 based on the big endian method.

(1) The load word (LW) instruction is executed. A 16-bit displacement value of 3 is added to a value stored in the register number R4 (suppose that R4 is set zero), to provide an effective address. According to the effective address, data is loaded from the data memory 15 and is stored in the register number R0.

(2) The load word (LW) instruction is executed. A 16-bit displacement value ot 7 is added to the value stored in the register number R4, to provide an effective address. According to the effective address, data is loaded from the data memory 15 and is stored in the register number R1, (3) The set SAR byte (SSARB) instruction is executed. A 2-bit displacement value of 3 is added to the value stored in the source register 10 at the register number R4 to provide a sum. Since this example is based on the big endian method, the sum is multiplied by 8 to provide a product, i.e. 24, and the product is stored in the shift amount register 12.

(4) The funnel shift (FSFI) instruction is executed. The values stored at the register numbers R1 and R0 are concatenated, and the value stored in the shift amount register 12 is used as a shift amount to shift the concatenated result. The shifted result is stored in the register number R1.

(5) A move (MOV) instruction is executed to copy the value at the register number R1 to a register number R2.

(6) The set SAR byte (SSARB) instruction is executed. A 2-bit displacement value of 1 is added to the value stored in the register number R4 (suppose that R4 is set 8) to provide a sum. The sum is multiplied by 8 to provide a product and the product is stored in the shift amount register 12.

(7) The funnel shift (FSFT) instruction is executed. The values stored at the register numbers R1 and R3 are concatenated, and the value stored in the shift amount register 12 is used as a shift amount to shift the concatenated result. The shifted result is stored in the register number R1.

(8) The funnel shift (FSFT) instruction is executed. The values stored at the register numbers R3 and R2 are concatenated, and the value stored in the shift amount register 12 is used as a shift amount to shift the concatenated result. The shifted result is stored at the register number R3.

(9) The store word (SW) instruction is executed. A 16-bit displacement value of 3 is added to the value stored in the register number R4, to provide an effective address. According to the effective address, the data stored in the register number R1 is stored in the data memory 15. This step is not shown in FIG. 10.

(10) The store word (SW) instruction is executed. A 16-bit displacement value of 7 is added to the value stored in the register number R4, to provide an effective address. According to the effective address, the data stored in the register number R3 is stored in the data memory 15. This step is not shown in FIG. 10.

As explained above, the microprocessor according to the embodiment uses the concatenate-shift function of the execution unit 11 and executes the set SAR byte instruction to set a shift amount applied to a concatenate-shift operation to align unaligned data. This improves the speed of the data accessing and aligning operations. For the big endian method, the set SAR byte instruction adds a constant value to a value stored in a register to provide a sum, multiplies the sum by 8 to provide a product, masks higher bits of the product, and writes a resultant value in the shift amount register 12. These four operations are executed by the single instruction of "set SAR byte" according to the embodiment. A related an without this instruction must execute four separate instructions to perform the four operations. If each instruction needs one cycle, the related art needs four cycles in total to complete the four instructions. Namely, the embodiment can improve an operation speed four times the related art.

Speedily aligning data in a memory may be achievable by preparing special load and store instructions. Such instructions, however, need special shift and merge circuits, to complicate a control scheme. On the other hand, the microprocessor according to the embodiment uses standard load and store instructions without such special instructions. The concatenate-shift function of the embodiment is usable not only for aligning unaligned data but also for, for example, rotating data.

The embodiment and accompanying drawings are to be considered in all respects as illustrative and not restrictive. Various modifications will become possible for those skilled in the art after receiving the teachings of the present disclosure without departing from the scope thereof.

For example, although the microprocessor according to the embodiment employs a 32-bit data bus to access a memory word by word, a data bus of 16, 64, 128, or any other bits is employable to access a memory by a required number of bits. If a 64-bit data bus is employed, a memory will be accessible 64 bits by 64 bits. If the big endian method is employed with a 64-bit data bus, the lower three bits of an address is multiplied by 8 to provide a product and the product is stored in the shift amount register 12. If the little endian method is employed with a 64-bit data bus, the lower three bits of an address is multiplied by 8 to provide a product, the product is subtracted from "64" to provide a difference, and the difference is stored in the shift amount register 12. As mentioned above, the microprocessor according to the embodiment of the present invention speedily aligns unaligned data without special circuits or control.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A microprocessor comprising:
   a register file including a plurality of registers, the register file configured to store data to be used for operations;
   a first source register configured to store a first register value;
   a second source register configured to store a second register value;
   a data memory configured to store data;
   an execution unit configured to
      execute a first load instruction that has a field specifying a first register in the register file, a field specifying a second register in the register file, and a field specifying a first immediate value,
      load first data, to the first register, from the data memory based on a value in the second register and the first immediate value,
      execute a second load instruction that has a field specifying a third register in the register file, a field specifying the second register, and a field specifying a second immediate value,
      load second data, to the third register, from the data memory based on a value in the second register and the second immediate value,
      execute a set SAR byte instruction that has a field specifying the second register and a field specifying a third immediate value that is the lower two bits of the first immediate value, and
      calculate a shift amount based on a value stored in the second register and the third immediate value;
   a shift amount register configured to store the calculated shift amount; and
   a shift unit configured to
      load the first data to the first source register and the second data to the second source register,
      concatenate the first and the second data in the first and the second source register, and
      shift the concatenated result by the shift amount stored in the shift amount register.

2. The microprocessor of claim 1, wherein:
   the execution unit multiplies lower bits of an address specified by an instruction operand by eight to provide a product and determines the product as the shift amount applied to the unaligned data.

3. The microprocessor of claim 1, wherein:
   if the microprocessor employs a 32-bit data bus, the execution unit multiplies lower two bits of an address specified by an instruction operand by eight to provide a product and determines the product as the shift amount applied to the unaligned data.

4. The microprocessor of claim 1, wherein:
   the execution unit multiplies lower bits of an address specified by an instruction operand by eight to provide a product, subtracts the product from the bit width of a data bus to provide a difference, and determines the difference as the shift amount applied to the unaligned data.

5. The microprocessor of claim 1, wherein:
   if the microprocessor employs a 32 bit data bus, the execution unit multiplies lower two bits of an address specified by an instruction operand by eight to provide a product, subtracts the product from 32 to provide a difference, and determines the difference as the shift amount applied to the unaligned data.

6. The microprocessor of claim 1, wherein:
   if the microprocessor employs a big endian memory system, the execution unit multiplies lower bits of an address specified by an instruction operand by eight to provide a product and determines the product as the shift amount applied to the unaligned data.

7. The microprocessor of claim 1, wherein:
   if the microprocessor employs a little endian memory system, the execution unit multiplies lower bits of an address specified by an instruction operand by eight to provide a product, subtracts the product from the bit width of a data bus to provide a difference, and determines the difference as the shift amount applied to the unaligned data.

8. A method of processing unaligned data in a microprocessor, comprising:
   executing a first load instruction that has a field specifying a first register in the register file, a field specifying a second register in the register file and a field specifying a first immediate value, to load a first part of the unaligned data to the first register, from the data memory based on a value in the second register and the first immediate value;
   executing a second load instruction that has a field specifying a third register in the register file, a field specifying the second register and a field specifying a second immediate value, to load a second part of the unaligned data to the third register, from the data memory based on a value in the second register and the second immediate value;
   executing a set SAR byte instruction that has a field specifying the second register and a field specifying a third immediate value that is lower two bits of the first immediate value, thus calculating a shift amount based on a value stored in the second register and the third immediate value concatenating the data stored in the first and second registers;
   shifting the concatenated data by the calculated shift amount; and
   storing the shifted result in one of the first and second registers.

9. The method of claim 8, wherein:
   when calculating a shift amount, the lower bits of an address specified by an instruction operand are multiplied by eight to provide the shift amount.

10. The method of claim 8, wherein:

when calculating a shift amount, the lower two bits of an address specified by an instruction operand are multiplied by eight to provide the shift if the microprocessor employs a 32-bit data bus.

11. The method of claim 8, wherein:

when calculating a shift amount, the lower bits of an address specified by an instruction operand are multiplied by eight to provide a product, subtract the product from the bit width of a data bus to provide the shift amount.

12. The method of claim 8, wherein:

when calculating a shift amount, the lower two bits of an address specified by an instruction operand are multiplied by eight to provide a product and then to subtract the product from 32 to provide the shift amount if the microprocessor employs a 32 bit data bus.

13. The method of claim 8, wherein:

when calculating a shift amount, the lower bits of an address specified by an instruction operand are multiplied by eight to provide the shift amount if the microprocessor employs a big endian memory system.

14. The method of claim 8, wherein:

when calculating a shift amount, the lower bits of an address specified by an instruction operand are multiplied by eight to provide a product and then to subtract the product from the bit width of a data bus to provide the shift amount applied if the microprocessor employs a little endian memory system.

* * * * *